United States Patent Office 2,922,142
Patented Jan. 19, 1960

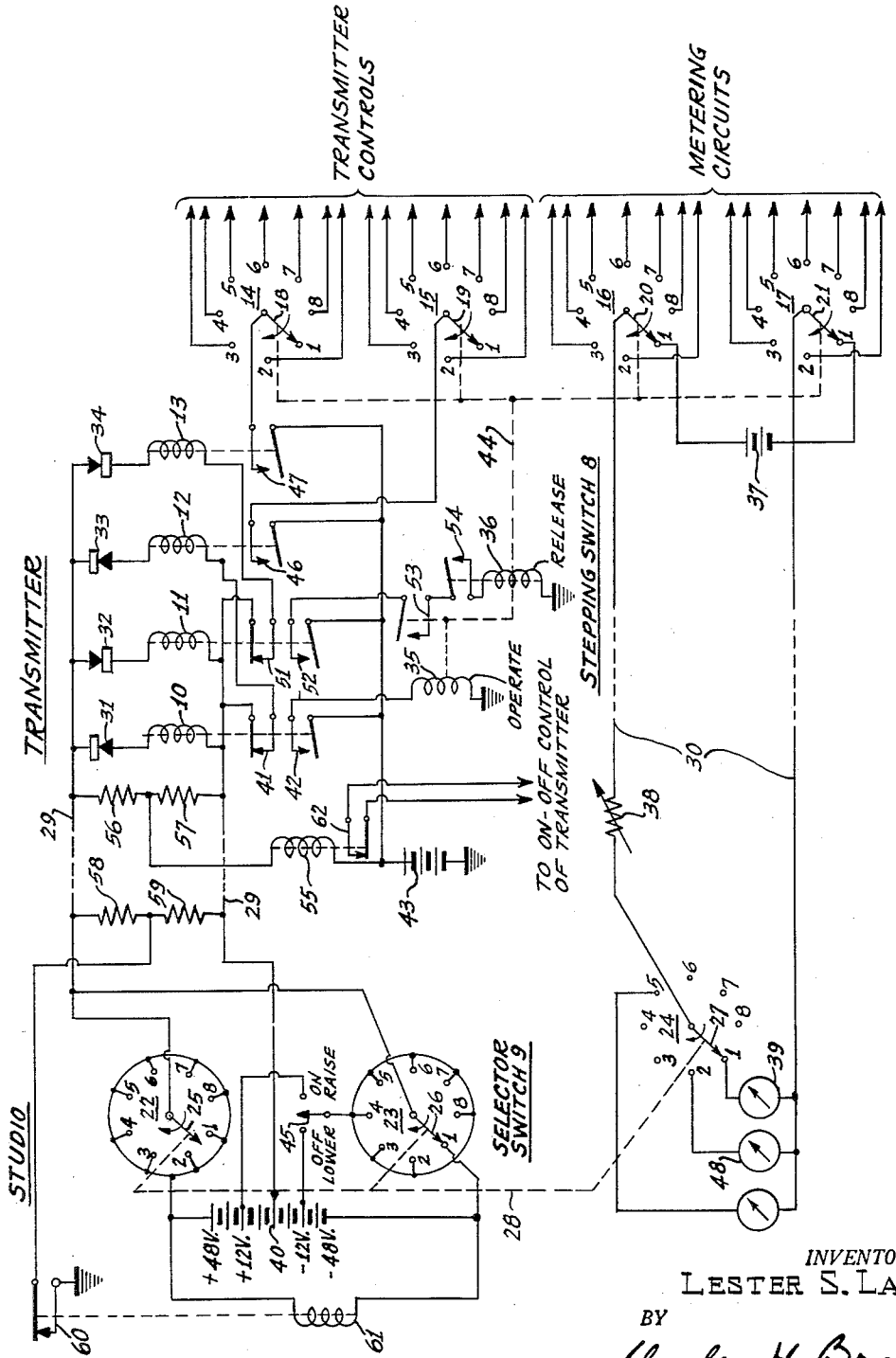

2,922,142

REMOTE CONTROL SYSTEM

Lester S. Lappin, Merchantville, N.J., assignor to Radio Corporation of America, a corporation of Delaware Application May 29, 1957, Serial No. 662,390

15 Claims. (Cl. 340—150)

The invention relates to remote control systems and particularly to a system for controlling the operation of equipment such as a radio transmitter from a remote location, as from a studio.

Remote control systems for obtaining a more efficient and effective use of controlled equipment are known. By using a remote control system to accomplish the various control functions and actions involved in the operation of the remotely located equipment, it is, for example, possible to avoid the expense of maintaining personnel at the location of the controlled equipment for performing the control functions and actions. A remote control system is also desirable when the controlled equipment is at a relatively inaccessible location.

Known types of remote control system tend to be complicated in construction and in operation, and require critical and difficult adjustments. In addition, such systems are often expensive to construct and maintain in terms of the number and types of components used therein. This is particularly true where the remote control system is required to accomplish a number of different control functions and actions in the operation of the controlled equipment.

It is an object of the invention to provide an improved remote control system which is simple in construction and in operation.

Another object is to provide a novel system by which a number of different control functions and actions, such as meter reading involved in the operation of equipment, can be accomplished by the operation of apparatus included in the system and positioned at a location remote from the equipment.

A further object is to provide a novel remote control system by which a number of different control functions involved in the operation of the controlled equipment can be selectively accomplished at a location remote from the equipment while simultaneously observing meter readings at the remote location indicating the resulting operating condition of the equipment.

Briefly, the objects of the invention are accomplished by a D.C. (direct current) remote control system including a stepping switch having a number of contact positions connected to the equipment that is to be controlled. The contact positions of the stepping switch correspond to different control functions or actions involved in the operation of the equipment. A selector switch is positioned at a desired location (such as a studio) remote from the equipment and is connected to the stepping switch through an arrangement of relay devices over a telephone line or similar transmission system.

The relay devices operate in a predetermined sequence according to voltages of different levels and polarity supplied over the telephone line by the operation of the selector switch. The relay devices respond to the voltages of different levels and polarity and cause the stepping switch to be operated so as to complete a connection between contact positions thereof and the equipment and to thereafter bring about the desired control function or action, as determined by the operation of the selector switch. Such control functions may include on and off switching, the raising or lowering of voltages at the equipment, and so on. The stepping switch is connected to the selector switch through the arrangement of relay devices such that the operation thereof is automatically synchronized with the operation of the selector switch. By the operation of the relay devices, provision is made for automatically homing the stepping switch upon the positioning of the selector switch in the home or rest condition thereof.

A feature of the invention is the metering arrangement whereby certain of the contact positions of the stepping switch are connected to the equipment to be controlled such that currents and voltages proportional to currents and voltages appearing at various points of the equipment appear at the contact positions. A second telephone line or transmission system is provided for selectively completing a connection between suitable meters provided at the location of the selector switch and the last-mentioned contact positions of the stepping switch. The particular metering connection completed will depend upon the operation of the selector switch and the resulting operation of the stepping switch by the relay arrangement. When a desired control function is performed at the controlled equipment by the operation of the remote control system, meter readings are simultaneously available at the location of the selector switch to assist in performing the control function and to provide a check on the resulting performance of the equipment. Both the control function and metering function are selectively performed by the operation of a single switch.

A more detailed description of the invention will now be given with reference to the single figure of the accompanying drawing which shows a circuit diagram of one embodiment of the invention. In describing the invention it will be assumed that it is desired to control a radio transmitter from a remote location such as a studio. However, the invention is not limited to this application and may be readily adapted for use in other applications.

Referring to the single figure of the drawing, the equipment of the remote control system located at the studio is shown at the left of the figure, while the equipment of the remote control system positioned at the location of the radio transmitter to be controlled is shown at the right of the figure. The equipment of the remote control system located at the transmitter includes a stepping switch, indicated generally by the reference numeral 8, having a number of operating positions and four relay devices 10 through 13. The stepping switch 8 is conventional in design and includes four segments or switching sections 14 through 17. Each of the sections 14 through 17 includes eight contact positions and a wiper arm 18 through 21, respectively. The wiper arms 18 through 21 are ganged together by a suitable mechanical connection such that they are rotated in a clockwise direction between the contact positions of the respective sections 14 through 17 in a synchronous and simultaneous manner.

A selector switch, indicated generally by the reference numeral 9, having a number of operating positions is located at the studio and includes three segments or sections 22 through 24. Each of the sections 22 through 24 includes eight contact positions and a wiper arm 25 through 27, respectively. The wiper arms 25 through 27 are ganged together by a suitable mechanical connection indicated by the dotted line 28 such that the wiper arms 25 through 27 are rotated in a simultaneous and synchronous manner by either a manual or automatic control in a clockwise direction. The contact positions of the respective sections 23, 24 are arranged in a similar manner in relation to the movement of the wiper arms 26 and 27, respectively. As the wiper arms 26, 27 are rotated, they are made to simultaneously engage by detent action the corresponding contact positions of the respective sections 23, 24. The wiper arms 26, 27 are, therefore, always in similar relative positions with respect to the contact positions of the sections 23, 24, respectively.

The contact positions of the section 22 are constructed as slideable contacts and are angularly offset with respect to the arrangement of the contact positions of sections 23, 24. Since the wiper arm 25 is operated synchronously and simultaneously with the wiper arms 26 and 27 by means of the connection 28, the wiper arm 25 will complete only a slideable, momentary contact with a contact position of section 22 as wiper arms 26, 27 are rotated from one contact position of the respective sections 23, 24 to another. The wiper arm 25 completes a momentary connection with a contact position of section 22 only when the wiper arms 26, 27 are away from or being driven between contact positions of the sections 23 and 24, respectively. It is possible to maintain closed connections through sections 23, 24 but only a momentary connection through the section 22 which occurs as the wiper arms 25 through 27 are made to rotate by the connection 28.

The studio may be located a considerable distance from the transmitter to be controlled. The selector switch 9 at the studio is connected to the arrangement of relay devices 10 through 13 over a first telephone line 29 or similar transmission system. In addition, the section 24 of the selector switch 9 is connected to sections 16, 17 of the stepping switch 8 at the transmitter over a second telephone line 30 which may be of the same construction and operation as the telephone line 29. As will be described, the telephone line 29 is used to complete the control functions and telephone line 30 is used to complete the metering functions according to the invention. While it will be assumed that telephone lines 29, 30 are used to complete the connections between the studio and the transmitter, other known transmission systems such as radio frequency transmission systems could be used in particular applications.

The relays 10 through 13 are polarized by means of series-connected rectifiers 31 through 34, respectively, and the sensitivies adjusted such that the relays 10 through 13 operate in response to current flow resulting from the application to the line 29 of voltages of different levels and polarity by the operation of the selector switch 9 at the studio. While diode rectifiers 31 through 34 are shown, other known devices designed to pass current in only one direction may be used. In describing the invention, specific voltage values will be given. However, the values are given only by way of example and can be altered to meet the requirements of a particular application. In the example given, relay 10 is arranged to operate only when +48 volts is supplied to the line 29. Relay 11 is arranged to operate only when −48 volts is supplied to the line 29, relay 12 is arranged to operate when +12 volts or a more positive voltage is supplied to the line 29 and relay 13 is arranged to operate when −12 volts or a more negative voltage is supplied to the line 29.

The contact positions of the sections 14, 15 of the stepping switch 8 correspond to various control functions involved in the operation of the transmitter. The contact positions of the sections 16, 17 of the stepping switch 8 are connected to various areas of the transmitter such that currents and voltages proportional to currents and voltages appearing at the areas appear at the contact positions. The connections completed to the contact positions of sections 16, 17 may be coordinated with the connections completed to the contact positions of sections 14, 15. In this manner, as a control function is performed according to the setting of the wiper arms 18 and 19, the simultaneous and synchronous movement of wiper arms 20, 21 results in metering information in the form of a current or voltage value corresponding to the control function performed being made available at the sections 16, 17 for application over line 30 to the studio.

In describing the operation of the invention, it will be assumed that the wiper arms 25 through 27 of the selector switch 9 and the wiper arms 18 through 21 of the stepping switch 8 are initially in the positions shown in the drawing. The wiper arms 25 through 27 and 18 through 21 may be considered to be in their respective home or rest positions. An electrical circuit is completed including a source of standard voltage represented by a battery 37, the contact positions 1 and wiper arms 20, 21 of the respective sections 16, 17 of the stepping switch 8, line 30, variable resistor 38, contact position 1 and wiper arm 27 of section 24 of the selector switch 9 and a suitable meter 39. The calibration of the metering circuit including line 30 may be checked and adjusted by means of the resistor 38 to compensate for variations in telephone line resistance.

It will be further assumed that the contact position 2 of the sections 14 through 17 of the stepping switch 8 corresponds to the control and metering function transmitter on-off and that an operator at the studio wishes to perform this control and metering function. The connection 28 is operated to cause the wiper arms 26, 27 to rotate into contact by detent action with the contact positions 2 of the respective sections 23, 24. As the wiper arms 25 through 27 are connected for simultaneous movement, wiper arm 25 will momentarily and slideably engage the contact position 2 of section 22 as the wiper arms 26, 27 are rotated to engage the contact positions 2 of the respective sections 23, 24. An electrical circuit is momentarily completed including a source of standard voltage represented by a battery 40, contact position 2 and wiper arm 25 of section 22, line 29, the winding of relay 10 and rectifier 31. The battery 40 is connected in the circuit so that +48 volts is momentarily applied from the battery 40 to the line 29. Relay 10 is momentarily operated, causing contacts 41 to open and contacts 42 to close. The contacts 41 of relay 10 are included in the operating circuit of relay 12 such that the opening of the contacts 41 prevents the operation of relay 12 at this time. The closing of contacts 42 completes an electrical circuit including a source of standard voltage represented by a battery 43 and the operate winding 35 of the stepping switch 8. During the interval in which the contacts 42 are closed, the operate winding 35 is energized. The wiper arms 18 through 21 are made to simultaneously rotate by means of a suitable mechanical connection represented by the dotted line 44 into contact with the contact positions 2 of the respective sections 14 through 17 of the stepping switch 8. At this time, the selection of the control and metering function to be performed will be completed.

A control switch 45 having a wiper arm arranged to be driven into contact with either one of two contact positions is connected between the battery 40 and the section 23 of the selector switch 9. One of the contact positions of switch 45 is connected to a +12 volt terminal of the battery 40, while the other or second contact position of switch 45 is connected to a −12 volt terminal of the battery 40. The wiper arm of the switch 45 is connected to the contact positions 2 through 8 of the section 23 of the selector switch 9. In the performance of the function transmitter on-off, if the operator at the studio desires to turn on the transmitter, the wiper arm of switch 45 is made to engage the on or right contact position of the switch 45. An electrical circuit is completed including the +12 volt terminal of battery 40, switch 45, contact position 2 and wiper arm 26 of section 23 of selector switch 9, line 29, the winding of relay 12 and rectifier 33. Relay 12 is operated, causing contacts 46 to close. An electrical or control circuit is completed including battery 43, contacts 46, contact position 2 and wiper arm 19 of section 15 of the stepping switch 8 and suitable contactors in the transmitter. The contactors are operated to place the transmitter in operation.

If, on the other hand, the operator at the studio desires to turn off the transmitter, the wiper arm of switch 45 is made to engage the off or left contact position of switch 45. An electrical circuit is completed including the —12 volt terminal of battery 40, switch 45, contact position 2 and wiper arm 26 of section 23, line 29, the winding of relay 13 and rectifier 34. Relay 13 is operated, causing contacts 47 to close. An electrical or control circuit is completed including battery 43, contacts 47, contact position 2 and wiper arm 18 of section 14 of the stepping switch 8 and the contactors in the transmitter. The contactors are released and the transmitter is made inoperative.

The contact positions 2 of sections 16, 17 are connected by means of a meter shunt to an area of the transmitter such that a voltage or current proportional to the voltage or current appearing at the area and desired to be read is available at the contact positions 2. In the case of the transmitter on-off function, the voltage or current appearing at the contact positions 2 may be indicative of the on or off status of the transmitter power supply or of a particular stage or stages of the transmitter. An electrical circuit is completed including the meter shunt at the transmitter, contact position 2 and wiper arm 20 of section 16, contact position 2 and wiper arm 21 of section 17, line 30, resistor 38, contact position 2 and wiper arm 27 of the section 24 of the selector switch 9 at the studio and a meter 48 provided with suitable calibration. The operator at the studio may by means of the meter 48 obtain a desired reading at the studio as to the condition of the transmitter.

While only one operation of the selector switch 9 and stepping switch 8 has been described, the operation of the invention is the same when an operator at the studio desires to perform a different control and metering function corresponding to one of the other contact positions 3 through 8 of the sections 14 through 17 of the stepping switch 8. The connection 28 is operated to cause the wiper arms 26, 27 to rotate to the desired contact positions of the respective sections 23, 24 of the selector switch 9 on a step-by-step basis. Each time a circuit for operating relay 10 is momentarily completed by section 22 due to the simultaneous rotation of the wiper arm 25 with the wiper arms 26 and 27, the stepping switch 8 is operated to cause the wiper arms 18 through 21 to simultaneously rotate into contact with the corresponding contact positions of the respective sections 14 through 17 of the stepping switch 8. In this manner, the operator at the studio can readily operate the remote control system to select the desired control and metering function. Once the control and metering function has been selected, it is possible to perform the control function in either one of two ways by means of the switch 45. By operating the switch 45 in one direction or manner, it is possible to accomplish an on or raise action at the transmitter. By operating the switch 45 in the other direction or second manner, it is possible to accomplish an off or lower action at the transmitter. In addition to transmitters on-off, other functions which may be controlled at the transmitter may include power output raise-lower, overload reset, standby generator on-off, plate voltage on-off, filaments on-off, and so on. The functions controlled may also include the on-off control of blowers, heating units and other equipment at the transmitter required for the proper operation of the transmitter.

A feature of the invention is the provision for automatically homing the stepping switch 8 when the selector switch 9 is returned to its home condition should the stepping switch 8 be out of synchronism with the selector switch 9 for any reason. When wiper arm 26 completes a revolution by means of connection 28 and engages contact position 1 of section 23 of selector switch 9, an electrical circuit is completed including the —48 volt terminal of battery 40, contact position 1 and wiper arm 26 of section 23, line 29, the winding of relay 11 and rectifier 32. Relay 11 is operated, causing contacts 51 to open and contacts 52 to close. Contacts 51 are included in the operating circuit of relay 13, and by their open condition prevent the operation of relay 13 at this time.

A pair of contacts 53, 54 are connected in series with the release winding 36 of the stepping switch 8. Contacts 54 are self-interrupting contacts and function to cause the intermittent energizing of the release winding 36 when the necessary circuit is completed therethrough. The use of such contacts in the operation of a stepping switch is known and need not be described in detail. The contacts 53 are operated as a function of the stepping switch 8 such that the contacts 53 are open when the selector switch 8 is in the home condition in which wiper arms 18 through 21 contact the contact positions 1 of the respective sections 14 through 17. In all other conditions of the stepping switch 8, the contacts 53 are closed. The contacts 53 may be operated by an eccentric cam wheel or disc driven by connection 44 or in any suitable manner known.

Assuming that the selector switch 8 is not in synchronism with the selector switch 9 and that, therefore, contacts 53 are closed, the closing of contacts 52 by the operation of relay 11 upon the wiper arm 26 engaging contact position 1 of sections 23 will complete an electrical circuit including battery 43, contacts 52, contacts 53, self-interrupting contacts 54 and the release winding 36. The release winding 36 is operated by the interrupting contacts 54 to cause the connection 44 to simultaneously rotate wiper arms 18 through 21 between the contact positions of the respective sections 14 through 17. When the wiper arms 18 through 21 engage the home contact or contact positions 1 of the respective sections 14 through 17, contacts 53 are opened. The operating circuit for the interrupting contacts 54 and the release winding 36 is broken, and the stepping switch 8 will remain in its home or starting condition. In this manner, the selector switch 9 and the stepping switch 8 are always maintained in synchronism, the synchronous control being performed automatically according to the invention. It should be noted that since stepping switch 8 is capable of rotation in one direction only, selector switch 9 is provided with a ratchet to permit rotation in a single direction.

In the operation of a remote control system, it is often desirable that the controlled equipment be rendered inoperative should the control of the equipment be lost. This is particularly true in the operation of equipment such as radio transmitters where the uncontrolled operation of the transmitters might result in the transmission of improper or spurious signals, producing radio interference, and so on. According to the invention, an electrical series circuit is provided including the battery 43, representing the control power at the transmitter, the winding of a fail-safe relay 55, resistors 56 and 57, line 29, resistors 58 and 59 and contacts 60, a return connection between the contacts 60 and battery 43 being provided through ground. In the example given, the contacts 62 of relay 55 are connected to the on-off controls of the transmitter so that the transmitter is rendered inoperative when the contacts 62 are open. In normal operation, the winding of relay 55 is energized, relay 55 is operated, and contacts 62 are closed. The transmitter can be operated in the controlled manner described. In the event of a loss of the line 29 or the failure of the battery 43, relay 55 becomes inoperative. Contacts 62 open, automatically rendering the transmitter inoperative.

As a further protection, the winding of a relay 61 is connected across battery 40, representing the control power at the studio. In normal operation, the winding of relay 61 is energized, relay 61 is operated and the contacts 60 included in the operating circuit of relay 55 are closed. In the event of the failure of battery 40, relay 61 becomes inoperative. Contacts 60 open, breaking the operating circuit of relay 55. Relay 55 becomes inoperative, and contacts 62 open. The transmitter is rendered inoperative. In this manner, the transmitter is automatically rendered inoperative upon the loss of remote control power at either the studio or the transmitter or in the event of the loss of the control line 29.

In the embodiment of the invention shown in the drawing, the sections 14 through 17 of the stepping switch 8 are shown as having eight contact positions. In practice, the number of contact positions may be varied according to the number of functions which it is desired to control at the transmitter or other equipment. The number of contact positions of the sections 22 through 24 of the selector switch 9 will correspond to the number of contact positions used in the sections 14 through 17 of the stepping switch 8. While meters are shown connected to only the contacts positions 1, 2 and 5 of section 24 of the selector switch 9, a properly calibrated meter may be connected to all or any number of the contact positions of section 24 according to the meter readings which are desired at the studio by the operation of sections 16, 17 of the stepping switch 8 in the manner described. The metering functions performed by sections 16, 17 and the meters at the studio may be coordinated with the control functions performed by sections 14, 15 so as to provide at the studio the meter readings desired. In a further modification, relays 10, 11 and rectifiers 31, 32 may be replaced with a single polarized relay of suitable design. Relays 12, 13 and rectifiers 33, 34 may also be replaced by a single polarized relay.

What is claimed is:

1. In combination, a stepping switch having a number of different operating positions, a plurality of relay devices connected to said stepping switch, a selector switch having a number of operating positions each corresponding to a different operating position of said stepping switch, a transmission path connecting said selector switch directly to each of said relay devices, a source of standard voltage connected to said selector switch, means for selectively operating said selector switch to assume a desired operating position thereof, said selector switch functioning upon the operation thereof by said means to supply voltage of a given level and polarity from said source to said path during momentary intervals, the number of said intervals being determined according to the selected operating position of said selector switch, one of said relay devices being set to operate in response to the voltage supplied to said path during said intervals to cause said stepping switch to assume the operating position thereof corresponding to the selected operating position of said selector switch.

2. In combination, a stepping switch having a number of different operating positions, a plurality of relay devices connected to said stepping switch, a selector switch having a number of operating positions each corresponding to a different operating position of said stepping switch, a conductor connecting said selector switch directly to each of said relay devices, a source of standard voltage connected to said selector switch, means for selectively operating said selector switch to assume a desired operating position thereof, said selector switch including a switching section functioning upon the operation of said selector switch to supply voltage of a given level and polarity from said source to said conductor during a momentary interval each time said selector switch is driven from one of the operating positions thereof to another, the number of said intervals being determined according to the selected operating position of said selector switch, one of said relay devices being set to operate in response to the voltage supplied to said conductor during said intervals to cause said stepping switch to assume the operating position thereof corresponding to the selected operating position of said selector switch.

3. In combination, a stepping switch having a number of different operating positions, a plurality of relay devices connected to said stepping switch, a selector switch having a number of operating positions each corresponding to a different operating position of said stepping switch, a conductor connecting said selector switch to said relay devices, a source of standard voltage connected to said selector switch, means for selectively operating said selector switch to assume a desired operating position thereof, said selector switch functioning upon the operation thereof by said means to supply voltage of a given level and polarity from said source to said conductor during momentary intervals, the number of said intervals being determined according to the selected operating position of said selector switch, one of said relay devices being set to operate in response to the voltage supplied to said conductor during said intervals to cause said stepping switch to assume the operating position thereof corresponding to the selected operating position of said selector switch, and means connected between said source and said selector switch for supplying a voltage of given level and polarity from said source to said conductor through said selector switch when said selector switch is in said selected operating position, a second one of said relay devices being set to respond to the last-mentioned voltage supplied to said conductor to complete an electrical circuit through said stepping switch to a utilization circuit according to the operating position assumed by said stepping switch.

4. In combination, a stepping switch having a home position and a number of different operating positions, a plurality of relay devices connected to said stepping switch, a selector switch having a home position and a number of operating positions each corresponding to a different operating position of said stepping switch, a conductor connecting said selector switch to said relay devices, a source of standard voltage connected to said selector switch, means for selectively operating said selector switch from the home position to assume a desired operating position thereof, said selector switch functioning upon the operation thereof by said means to supply voltage of a given level and polarity from said conductor during momentary intervals, the number of said intervals being determined according to the selected operating position of said selector switch, one of said relay devices being set to operate in response to the voltage supplied to said conductor during said intervals to operate said stepping switch from the home position to assume the operating position thereof corresponding to the selected operating position of said selector switch, said selector switch functioning upon being returned to the home position thereof by said means to supply a voltage of given level and polarity from said source to said conductor, a second one of said relay devices being set to respond to said last-mentioned voltage supplied to said conductor to cause said stepping switch to return to the home position thereof.

5. In combination, a stepping switch having a home position and a number of different operating positions, a plurality of relay devices connected to said stepping switch, a selector switch having a home position and a number of operating positions each corresponding to a different operating position of said stepping switch, a conductor connecting said selector switch to said relay devices, a source of standard voltage connected to said selector switch, means for selectively operating said selector switch from the home position to assume a desired operating position thereof, said selector switch functioning upon the operation thereof by said means to supply a first voltage of a given level and polarity from said source to said conductor during momentary intervals, the number of said intervals being determined according to the selected operating position of said selector switch, one of said relay devices being set to operate in response to said first voltage supplied to said conductor during said intervals to cause said stepping switch to assume the operating position thereof corresponding to the selected operating position of said selector switch, selector switch for supplying a second voltage of given level and polarity from said source to said conductor through said selector switch when said selector switch is in said selected operating position, a second one of said relay devices being set to respond to said second voltage supplied to said conductor to complete an electrical circuit through said stepping switch to a utilization circuit according to the operating position assumed by said stepping switch, said selector switch functioning upon being returned to the home position thereof by said first-mentioned means to supply a third voltage of given level and polarity from said source to said conductor, a third one of said relay devices being set to respond to said third voltage supplied to said conductor to cause said stepping switch to return to the home position thereof.

6. In combination, a stepping switch having a home position and a number of different operating positions, a plurality of relay devices connected to said stepping switch, a selector switch having a home position and a number of operating positions each corresponding to a different operating position of said stepping switch, a conductor connecting said selector switch to said relay devices, a source of standard voltage connected to said selector switch, means for selectively operating said selector switch from the home position to assume a desired operating position thereof, said selector switch including means functioning upon the operation of said selector switch to supply a voltage of given level and positive polarity from said source to said conductor during a momentary interval each time said selector switch is operated from one of the positions thereof to another, the number of said intervals being determined according to the selected operating position of said selector switch, one of said relay devices being set to operate in response to the voltage supplied to said conductor during said intervals to operate said stepping switch from the home position to assume the operating position thereof corresponding to the selected operating position of said selector switch, said selector switch functioning upon being returned to the home position thereof by said means to supply a voltage of said level and negative polarity from said source to said conductor, a second one of said relay devices being set to respond to said last-mentioned voltage supplied to said conductor to cause said stepping switch to return to the home position thereof.

7. In combination, a stepping switch having a number of different operating positions, a plurality of relay devices connected to said stepping switch, a selector switch having a number of operating positions each corresponding to a different operating position of said stepping switch, a transmission path connecting said selector switch to said relay devices, a source of standard voltage connected to said selector switch, means for selectively operating said selector switch to assume a desired operating position thereof, said selector switch functioning upon the operation thereof by said means to supply voltage of a given level and polarity from said source to said path during momentary intervals, the number of said intervals being determined according to the selected operating position of said selector switch, one of said relay devices being set to operate in response to the voltage supplied to said path during said intervals to cause said stepping switch to assume the operating position thereof corresponding to the selected operating position of said selector switch, means connected between said source and said selector switch for selectively supplying either a second voltage of given level and polarity or a third voltage of given level and polarity from said source to said path through said selector switch when said selector switch is in said selected operating position, a second one of said relay devices being set to respond to said second voltage supplied to said path to complete an electrical circuit through said stepping switch according to the operating position assumed by said stepping switch, a third one of said relay devices being set to respond to said third voltage supplied to said path to complete a second electrical circuit through said stepping switch according to the operating position assumed by said stepping switch.

8. In combination, a stepping switch having a home position and a number of different operating positions, a plurality of relay devices connected to said stepping switch, a selector switch having a home position and a number of operating positions each corresponding to a different operating position of said stepping switch, a conductor connecting said selector switch to said relay devices, a source of standard voltage connected to said selector switch, means for selectively operating said selector switch to assume a desired operating position thereof, said selector switch functioning upon the operation thereof by said means to supply voltage of a given level and polarity from said source to said conductor during momentary intervals, the number of said intervals being determined according to the selected operating position of said selector switch, one of said relay devices being set to operate in response to the voltage supplied to said conductor during said intervals to cause said stepping switch to assume the operating position thereof corresponding to the selected operating position of said selector switch, means connected between said source and said selector switch for selectively supplying either a second voltage of given level and polarity or a third voltage of given level and polarity from said source to said conductor through said selector switch when said selector switch is in said selected operating position, a second one of said relay devices being set to respond to said second voltage supplied to said conductor to complete an electrical circuit through said stepping switch according to the operating position assumed by said stepping switch, a third one of said relay devices being set to respond to said third voltage supplied to said conductor to complete a second electrical circuit through said stepping switch according to the operating position assumed by said stepping switch, said selector switch functioning upon being returned to the home position thereof by said first-mentioned means to supply a fourth voltage of given level and polarity from said source to said conductor, a fourth one of said relay devices being set to respond to said fourth voltage supplied to said conductor to cause said stepping switch to return to the home position thereof.

9. In combination, a stepping switch having a home position and a number of different operating position, a plurality of relay devices connected to said stepping switch, a selector switch having a home position and a number of operating positions each corresponding to a different operating position of said stepping switch, a conductor connecting said selector switch to said relay devices, a source of standard voltage connected to said selector switch, means for selectively operating said selector switch to assume a desired operating position thereof, said selector switch functioning upon the operation thereof by said means to supply voltage of a given level and polarity from said source to said conductor during momentary intervals, the number of said intervals being determined according to the selected operating position of said selector switch, one of said relay devices being set to operate in response to the voltage supplied to said conductor during said intervals to cause said stepping switch to assume the operating position thereof corresponding to the selected operating position of said selector switch, means connected between said source and said selector switch for selectively supplying either a second voltage of given level and polarity or a third voltage of the same level as said second voltage but of the opposite polarity from said source to said conductor when said selector switch is in said selected operating position, a second one of said relay devices being set to respond to said second voltage supplied to said conductor to complete an electrical circuit through said stepping switch according to the operating position assumed by said stepping switch, a third one of said relay devices being set to respond to said third voltage supplied to said conductor to complete a second electrical circuit through said stepping switch according to the operating position assumed by said stepping switch, said selector switch functioning upon being returned to the home position thereof by said first-mentioned means to supply a fourth voltage of the same level as said first voltage but of the opposite polarity from said source to said conductor, a fourth one of said relay devices being set to respond to said fourth voltage supplied to said conductor to cause said stepping switch to return to the home position thereof.

10. In combination, a stepping switch having a home position and a number of different operating positions, a plurality of relay devices connected to said stepping switch, a selector switch having a home position and a number of operating positions each corresponding to a different operating position of said stepping switch, a conductor connecting said selector switch to said relay devices, a source of standard voltage connected to said selector switch, means for selectively operating said selector switch to assume a desired operating position thereof, said selector switch functioning upon the operation thereof by said means to supply voltage of a given level and positive polarity from said source to said conductor during momentary intervals, the number of said intervals being determined according to the selected operating position of said selector switch, one of said relay devices being set to operate in response to the positive voltage supplied to said conductor during said intervals to cause said stepping switch to assume the operating position thereof corresponding to the selected operating position of said selector switch, means connected between said source and said selector switch for selectively supplying either a second voltage of a level less than that of said first voltage and positive polarity or a third voltage of the same level as said second voltage and negative polarity from said source to said conductor when said selector switch is in said selected operating position, a second one of said relay devices being set to respond to said second positive voltage supplied to said conductor to complete an electrical circuit through said stepping switch according to the operating position assumed by said stepping switch, a third one of said relay devices being set to respond to said third negative voltage supplied to said conductor to complete a second electrical circuit through said stepping switch according to the operating position assumed by said stepping switch, said selector switch functioning upon being returned to the home position thereof by said first-mentioned means to supply a fourth voltage of the same level as said first voltage and negative polarity from said source to said conductor, a fourth one of said relay devices being set to respond to said fourth negative voltage supplied to said conductor to cause said stepping switch to return to the home position thereof.

11. In combination, a stepping switch having a number of operating positions and including a plurality of similar switching sections each having a number of contact positions and a wiper arm, a selector switch having a number of different operating positions each corresponding to a different contact position of each of said switching sections, said wiper arms being positioned in and driven by said stepping switch so that at each operating position of said stepping switch said wiper arms contact the contact positions of said respective switching sections corresponding to the same one of the operating positions of said selector switch, a plurality of relay devices connected to said stepping switch, a conductor connected between said selector switch and each of said relay devices, a source of standard voltage connected to said selector switch, means for selectively operating said selector switch to assume a desired one of the operating positions thereof, said selector switch functioning to supply upon the operation thereof voltage of a given level and polarity from said source to said conductor during momentary intervals, the number of said intervals being determined according to the selected operating position of said selector switch, one of said relay devices being set to respond to the voltage supplied to said conductor to cause said stepping switch to assume an operating position in which said wiper arms are in contact with the contact positions of said respective switching sections corresponding to the selected operating position of said selector switch.

12. In combination, a stepping switch having a number of operating positions and including a plurality of similar switching sections each having a number of contact positions and a wiper arm, a selector switch having a number of different operating positions each corresponding to a different contact position of each of said switching sections, said wiper arms being positioned in and driven by said stepping switch so that at each operating position of said stepping switch said wiper arms contact the contact positions of said respective switching sections corresponding to the same one of the operating positions of said selector switch, a plurality of relay devices connected to said stepping switch, a conductor connected between said selector switch and said relay devices, a source of standard voltage connected to said selector switch, means for selectively operating said selector switch to assume a desired one of the operating positions thereof, said selector switch functioning to supply upon the operation thereof voltage of a given level and polarity from said source to said conductor during a momentary interval, the number of said intervals being determined according to the selected operating position of said selector switch, one of said relay devices being set to respond to the voltage supplied to said conductor to cause said stepping switch to assume an operating position in which said wiper arms are in contact with the contact positions of said respective switching sections corresponding to the selected operating position of said selector switch, means connected between said source and said selector switch for supplying a voltage of given level and polarity from said source to said conductor through said selector switch when said selector switch is in said selected operating position, a second one of said relay devices being set to respond to said last-mentioned voltage supplied to said conductor to complete an electrical circuit through a wiper arm and contact position of one of said switching sections to a utilization circuit, the particular contact position of said one switching section included in said circuit being determined according to the operating position assumed by said stepping switch.

13. In combination, a stepping switch having a home position and a number of operating positions, said stepping switch including a plurality of similar switching sections each having a number of contact positions and a wiper arm, a selector switch having a home position and a number of different operating positions each corresponding to a different contact position of each of said switching sections, said wiper arms being positioned in and driven by said stepping switch so that at each operating position of said stepping switch said wiper arms contact the contact positions of said respective switching sections corresponding to the same one of the operating positions of said selector switch, a plurality of relay devices connected to said stepping switch, a conductor connected between said selector switch and said relay devices, a source of standard voltage connected to said selector switch, means for selectively operating said selector switch to assume a desired one of the operating positions thereof, said selector switch including means functioning to supply during a momentary interval a voltage of given level and polarity from said source to said conductor upon each operation of said selector switch from one position thereof and into another, the number of said intervals being determined according to the selected operating position of said selector switch, one of said relay devices being set to respond to the voltage supplied to said conductor to cause said stepping switch to assume an operating position in which said wiper arms are in contact with the contact positions of said respective switching sections corresponding to the selected operating position of said selector switch, means connected between said source and said selector switch for selectively supplying either a second voltage of given level and polarity or a third voltage of given level and polarity from said source to said conductor through said selector switch when said selector switch is in said selected operating position, a second one of said relay devices being set to respond to said second voltage supplied to said conductor to complete an electrical circuit through the wiper arm and contact position of one of said switching sections, a third one of said relay devices being set to respond to said third voltage supplied to said conductor to complete a second electrical circuit through the wiper arm and contact position of a second one of said switching sections, the contact positions included in said first and second circuits being determined according to the operating position assumed by said stepping switch, said selector switch functioning upon being returned to the home position thereof by said first-mentioned means to supply a fourth voltage of given level and polarity from said source to said conductor, a fourth one of said relay devices being set to respond to said fourth voltage supplied to said conductor to cause said stepping switch to return to the home position thereof.

14. A system for controlling equipment from a remote location comprising, in combination, a stepping switch having a number of different operating positions, a plurality of relay devices connected to said stepping switch, a selector switch having a number of operating positions each corresponding to a different operating position of said stepping switch, a conductor connecting said selector switch to said relay devices, a source of standard voltage connected to said selector switch, means for selectively operating said selector switch to assume a desired operating position thereof, said selector switch functioning upon the operation thereof by said means to supply voltage of a given level and polarity from said source to said conductor during momentary intervals, the number of said intervals being determined according to the selected operating position of said selector switch, one of said relay devices being set to operate in response to the voltage supplied to said conductor during said intervals to cause said stepping switch to assume the operating position thereof corresponding to the selected operating position of said selector switch, means connected between said source and said selector switch for supplying a voltage of given level and polarity from said source to said conductor through said selector switch when said selector switch is in said selected operating position, a second one of said relay devices being set to respond to the last-mentioned voltage supplied to said conductor to complete and thereby energize a control circuit connected through said stepping switch to said equipment according to the operating position assumed by said stepping switch, a second conductor connected between said selector switch and said stepping switch, a meter connected to said selector switch, means for connecting a metering circuit of said equipment to said stepping switch, said selector switch functioning when in said selected operating position to connect said second conductor at one end to said meter and said stepping switch functioning when in the operating position thereof corresponding to said selected operating position to connect the other end of said second conductor to said metering circuit over said connecting means, whereby a meter reading is provided by said meter at the time of the completion of said control circuit.

15. A system for controlling equipment from a remote location comprising, in combination, a stepping switch having a number of different operating positions, a plurality of relay devices connected to said stepping switch, a selector switch having a number of operating positions each corresponding to a different operating position of said stepping switch, a conductor connecting said selector switch to said relay devices, a source of standard voltage connected to said selector switch, means for selectively operating said selector switch to assume a desired operating position thereof, said selector switch functioning upon the operation thereof by said means to supply voltage of a given level and polarity from said source to said conductor during momentary intervals, the number of said intervals being determined according to the selected operating position of said selector switch, one of said relay devices being set to operate in response to the voltage supplied to said conductor during said intervals to cause said stepping switch to assume the operating position thereof corresponding to the selected operating position of said selector switch, means connected between said source and said selector switch for selectively supplying either a second voltage of given level and polarity or a third voltage of given level and polarity from said source to said conductor through said selector switch when said selector switch is in said selected operating position, a second one of said relay devices being set to respond to said second voltage supplied to said conductor to complete a control circuit through said stepping switch to said equipment according to the operating position assumed by said stepping switch, a third one of said relay devices being set to respond to said third voltage supplied to said conductor to complete a second control circuit through said stepping switch to said equipment according to the operating position assumed by said stepping switch, a second conductor connected between said selector switch and said stepping switch, a meter connected to said selector switch, means for connecting a metering circuit of said equipment to said stepping switch, said selector switch functioning when in said selected operating position to connect said second conductor at one end to said meter and said stepping switch functioning when in the operating position thereof corresponding to said selected operating position to connect the other end of said second conductor to said metering circuit over said connecting means, whereby a meter reading is provided by said meter simultaneously with the selective completion of said control circuits, said selector switch functioning upon being returned to the home position thereof by said first-mentioned means to supply a fourth voltage of given level and polarity from said source to said first conductor, a fourth one of said relay devices being set to respond to said fourth voltage supplied to said first conductor to cause said stepping switch to return to the home position thereof.

References Cited in the file of this patent

UNITED STATES PATENTS 2,230,859    Blake _____ Feb. 4, 1941